Patented June 3, 1952

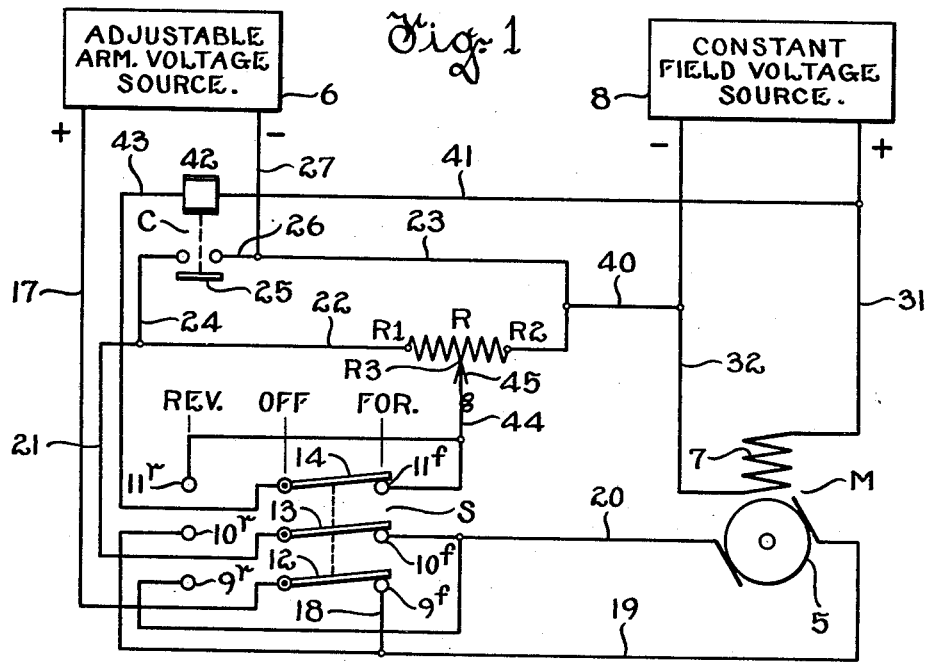
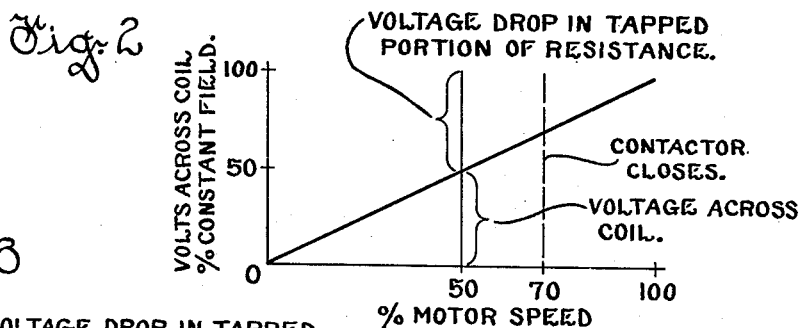
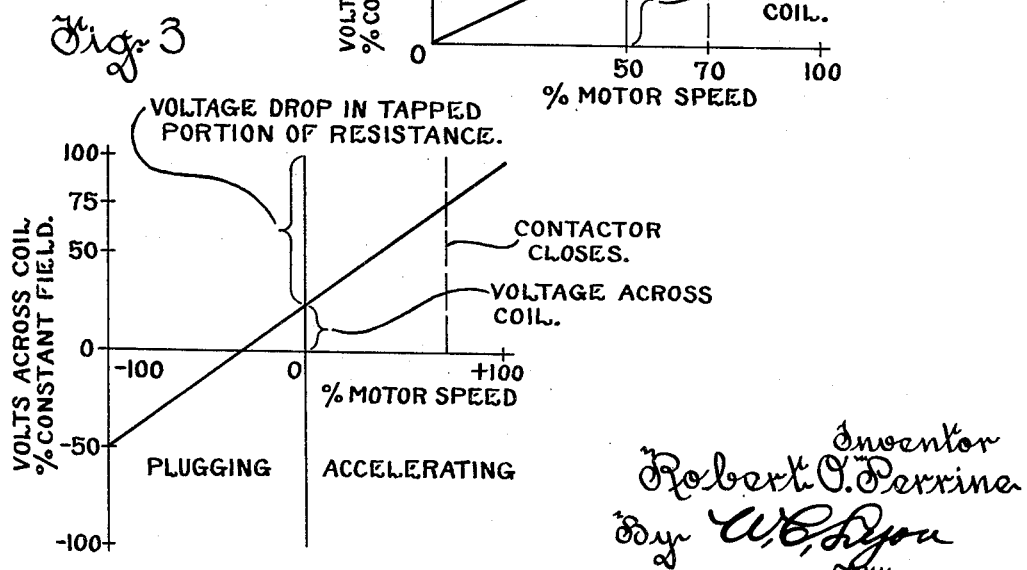

2,598,826

UNITED STATES PATENT OFFICE 2,598,826

ELECTRIC MOTOR CONTROL

Robert O. Perrine, Wauwatosa, Wis., assignor to Cutler-Hammer, Inc., Milwaukee, Wis., a corporation of Delaware Application January 23, 1950, Serial No. 140,001

3 Claims. (Cl. 318—421)

This invention relates to improvements in electric motor control.

More particularly, this invention relates to an improved adjustable voltage control circuit for direct current motors wherein the voltage in the armature circuit may be of a different value each time the motor is started from rest while the voltage in the motor field circuit is of a constant value.

The most widely used method of preventing excessive current inrush and providing uniform acceleration when starting electric motors is that in which a resistance is inserted into the motor circuit on starting and is then shunted out as the motor comes up to speed. Various arrangements are used to shunt out the resistance at the proper point in the accelerating cycle, varying from those which are simple and inexpensive to those which are complex and expensive. However, there has been no inexpensive, simple and reliable system for shunting out the accelerating resistance used in adjustable voltage control systems for D. C. motors. The only practical systems heretofore available were those which used various types of timing devices, series relay contactors or other similar and relatively expensive devices. Therefore, an object of this invention is to provide in adjustable voltage systems for D. C. motors an accelerating control that shall be simple, efficient and reliable and which may be readily and easily manufactured.

Another object of this invention is to provide for adjustable voltage systems for D. C. motors a control circuit which uses a simple shunt contactor to control acceleration.

A further object is to provide for such systems an accelerating scheme which is of particular advantage in plugging circuits.

A more specific object is to provide an accelerating system which is suitable without adjustment for either reversing or non-reversing adjustable voltage control systems for D. C. motors.

A still more specific object is to provide in adjustable voltage systems for D. C. motors an accelerating control which is much more economical to manufacture than those which use timing devices, series relay contactors or other similarly expensive devices.

Various other objects and advantages will hereinafter appear.

Figure 1 of the accompanying drawing is a schematic illustration of a reversing adjustable voltage control system for a D. C. motor, the control system being shown as containing an embodiment of my invention which will now be described.

Figs. 2 and 3 show conditions which could be selected for two different applications of my invention.

Referring to Fig. 1, a direct current motor, indicated generally by M, is seen to have an armature 5 which is supplied with current from an adjustable voltage source 6, and also to have a field 7 which is supplied with current from a constant voltage source 8. The control means for motor M includes a reversing main switch S, an accelerating resistance R and an accelerating switch C.

The reversing switch S is shown for purposes of illustration only as being a knife switch of the three pole, double throw type. The lower two pairs of contacts 9r, 9f and 10r, 10f, provide for reversing the current through the armature while the upper pair of contacts 11r and 11f function as interlocking contacts in the accelerating control circuit. Knife blades 12, 13 and 14, which are mechanically connected, coact with the contacts. Obviously, other types of reversing switches and interlocking contacts can be used to provide the same functions. However, it is to be understood that my invention does not require the inclusion of a reversing switch in the control circuit inasmuch as it is suitable for both non-reversing and reversing control circuits.

Accelerating resistance R may be of any type suitable for holding the armature inrush current to the desired value, and must also be suitable for tapping at a point intermediate its ends.

The accelerating switch C is a simple electromagnetic normally open contactor which when closed functions to shunt out accelerating resistance R. Its operating coil 42 is connected in series with the accelerating control circuit.

To operate the accelerating switch C, I have provided a novel control scheme which uses the constant voltage of the field source as a reference to establish a definite voltage at which the accelerating switch may pick up. This is accomplished by connecting one side of the switch operating coil 42 to the positive line 31 of the field source, and by connecting the other side of the coil to an intermediate point R3 of the resistance R. This latter connection is made through contacts interlocked with the motor armature switch to insure that the contactor will drop out when disconnecting the motor armature. The coil circuit is then completed by tying together the negative lines of the armature and field circuits. In this manner operation of the accelerating switch becomes practically a matter of straight current limit control. It is obvious that the scheme would work equally well if the current were reversed in both circuits, provided that tap 45 be properly repositioned.

My novel scheme is such that there is no definite restriction in the relation of the voltages of the armature source and the field source. In order to adjust for different relative voltages, the resistance R1—R2 is merely tapped for the point R3 so that the voltage drop R2—R3 is appropriate to the field voltage source in order to obtain proper operation of the scheme. To further illustrate this point, Figs. 2 and 3 show two possible application situations. Fig. 2 shows conditions which might be selected for a straight acceleration scheme for a non-reversing motor. In this case, the voltage drop across the resistance step R2—R3 has been selected equal to the voltage of the field source 8 with the motor M at zero speed and with full voltage applied to the armature source 6. Since the voltages across the resistor step and the field source are opposed insofar as the contactor is concerned, the net voltage is zero on the coil 42 at standstill and increases as the motor M accelerates and the accelerating current decreases. The shunt contactor C is set up to operate at an equivalent of 70% motor speed under the full voltage conditions. Under reduced voltage conditions the contactor merely closes at a lower speed. If the armature voltage is low enough, the contactor may close immediately. Thus the same current inrush is assured each time the accelerating contactor closes.

Fig. 3 shows another arrangement which might be applied to a reversing control such as that shown in Fig. 1, and which would have the property of holding the accelerator out during plugging as well as during acceleration. In this case, I have shown the net voltage across the contactor coil at full speed plugging as being a figure somewhat less than the contactor pick-up voltage appropriate to that during acceleration. In order to make the scheme as sensitive as possible and as free from coil heating changes, etc. as possible, it is desirable to have the voltage change as large as possible. By utilizing a selection of voltages as just described this can be accomplished.

In Fig. 1 the motor control circuit containing an embodiment of my invention is shown immediately after the main switch S has been thrown to "forward" position. Direct current is flowing to armature 5 of motor M from adjustable voltage source 6 through line 17, knife switch blade 12, forward contact 9f, line 18, and line 19. After passing through the armature, the current returns to its source through line 20, contact 10f, switch blade 13, line 21, line 22, resistance R, line 23, and thence through line 27. At the same time the separately excited shunt field 7 is receiving direct current from constant voltage source 8 through lines 31 and 32.

At this point there is little or no current in the shunt contactor coil 42 because point R3 at which tap 45 connects with resistance R has been selected so that the voltage drop R2—R3 is appropriate to the field source voltage. However, as motor M accelerates and the armature current decreases, the voltage drop across R2—R3 also decreases. Current of an increasing value begins to flow from line 31, through line 41, thence through contactor coil 42, line 43, interlock switch blade 14, contact 11f, line 44, tap 45, resistance step R2—R3 and then to the field voltage source negative line 32 through lines 23 and 40. Finally, at the preselected value of armature current the accelerating contactor switch C will pick up and shunt out the accelerating resistance R. The armature current will then by-pass the accelerating resistance and flow from line 21 to line 27 through line 24, contactor element 25 and line 26 which connects with line 27.

The circuit will remain in the above condition until the main switch is thrown to "off" position, upon which the contactor will drop out and remain out. However, if the switch is thrown from "forward" to "reverse" position, the contactor will drop out and will stay out only until the motor begins to come up to speed in the opposite direction, assuming, of course, that point R3 has been properly selected. In this manner the plugging current is also properly controlled.

What I claim as new is:

1. In a control system for a direct current motor of the class wherein the motor field is supplied by a constant voltage source, the motor armature is supplied by another voltage source, and the armature circuit contains an accelerating resistance, a normally open electroresponsive accelerating switch arranged to shunt out said resistance and an operating coil for said switch, the combination in series with said coil of an electrical control circuit which leads from one side of the field source to that side of the armature circuit containing said resistance, thence through a preselected portion of said resistance to the other side of said field source, the arrangement being such that when the current in the armature circuit decreases to a certain predetermined value the current in the coil increases to a value sufficient to close said accelerating switch.

2. The combination with an adjustable voltage source and a direct current motor having its field winding supplied from a constant voltage source, of a resistor, means for connecting the armature of said motor across said adjustable voltage source in series with said resistor, means including a normally open electroresponsive switch for shunting out said resistor from the armature circuit, and a control circuit for the operating coil of said switch leading from one side of said constant voltage source through said coil to a point on said resistor and thence through a preselected portion of said resistor to the other side of said constant voltage source.

3. The combination with an adjustable voltage source and a direct current motor having its field winding supplied from a constant voltage source, of a resistor, means for connecting the armature of said motor across said adjustable voltage source in series with said resistor for operation in reverse directions selectively, means including a normally open electroresponsive switch for shunting out said resistor from the armature circuit, and a control circuit for the operating coil of said switch leading from one side of said constant voltage source through said coil to a point on said resistor and thence through a preselected portion of said resistor to the other side of said constant voltage source.

ROBERT O. PERRINE.

REFERENCES CITED

The following references are of record in the file of this patent:

UNITED STATES PATENTS

| Number | Name | Date |
| --- | --- | --- |
| 1,318,620 | Stevens et al. | Oct. 14, 1919 |
| 1,321,019 | Eaton | Nov. 4, 1919 |
| 1,421,242 | James | June 27, 1922 |
| 1,753,116 | Holmes | Apr. 1, 1930 |
| 1,845,375 | Weimer | Feb. 16, 1932 |